United States Patent [19]

Marini et al.

[11] 4,410,484

[45] Oct. 18, 1983

[54] PROCESS AND APPARATUS FOR ACOUSTIC AND ULTRASONIC DETECTION OF DEFECTIVE NUCLEAR REACTOR FUEL ASSEMBLIES

[75] Inventors: Jean Marini, Marly le Roi; Alain Gravelle, Fontenay-aux-Roses; Jean-Claude Weilbacher, Champagne-sur-Oise, all of, France

[73] Assignee: Framatome, Courbevoie, France

[21] Appl. No.: 188,367

[22] Filed: Sep. 18, 1980

[30] Foreign Application Priority Data

Sep. 26, 1979 [FR] France .............................. 79 23909

[51] Int. Cl.³ ........................................... G21C 17/00
[52] U.S. Cl. ................................................. 376/252
[58] Field of Search ........................................ 376/252

[56] References Cited

U.S. PATENT DOCUMENTS

| | | | |
|---|---|---|---|
| 3,936,348 | 2/1976 | Wachter et al. | 376/252 |
| 3,945,245 | 3/1976 | Stehle et al. | 376/252 |
| 4,016,749 | 4/1977 | Wachter | 376/252 |
| 4,039,376 | 8/1977 | Watchter | 376/252 |
| 4,201,092 | 5/1980 | Dau | 376/252 |

FOREIGN PATENT DOCUMENTS

| | | | |
|---|---|---|---|
| 2642156 | 3/1978 | Fed. Rep. of Germany | 376/252 |
| 51-16597 | 5/1976 | Japan | 376/252 |

*Primary Examiner*—Sal Cangialosi
*Attorney, Agent, or Firm*—Pollock, Vande Sande & Priddy

[57] ABSTRACT

Gases contained in the sheaths of the fuel elements are made to expand in order to cause the escape of gas bubbles in the protective liquid into which the fuel assemblies are immersed. The progress of the gas bubbles in the protective liquid is arrested by means of a screen (1) located above the assembly and an acoustic phenomenon associated with the impact of the gas bubbles on the screen or with the accumulation of gas below the surface of the screen is recorded. The appearance of this acoustic phenomenon permits the detection of defective assemblies.

The invention applies in particular to pressurized water nuclear reactors.

8 Claims, 2 Drawing Figures

PROCESS AND APPARATUS FOR ACOUSTIC AND ULTRASONIC DETECTION OF DEFECTIVE NUCLEAR REACTOR FUEL ASSEMBLIES

The invention relates to a process for acoustic and ultrasonic detection of nuclear reactor fuel assemblies which have become defective in service in the reactor by the appearance of cracks in the sheath enclosing the fissile material of the fuel elements constituting the assemblies.

The invention also relates to an instrument for operating the acoustic detection process.

When nuclear reactors, such as pressurized water nuclear reactors, are shut down for recharging, if a high level of activity has been detected in the primary fluid of the reactor, a check is carried out on the fuel assemblies to discover those which have become defective in service inside the reactor.

These defective fuel assemblies allow the escape through the cracks in the sheath material of some of their fuel elements of radioactive product which contaminate the primary fluid.

In the case of pressurized water reactors, the fuel assemblies consist of bundles of fuel rods consisting of long tubes of sheath material enclosing the fissile material.

During periods of shut-down of the reactor for recharging, there is occasion to eliminate or repair defective assemblies in order to replace in the heart of the reactor assemblies the sheath material of which does not show any more cracks.

It is therefore necessary to detect defective assemblies among those which have resided in the core and which are involved in the recharging operation.

For this purpose, each of the assemblies is tested separately, entirely submerged in the water of the deactivation pool, which permits avoidance of contamination in the neighborhood of the assembly brought from the reactor core.

Mostly, for detection of cracks in the fuel elements of the assemblies, use is made of the fact that the cracked fuel rods contain water which has infiltrated into the inside of the rod through the cracks.

This water inside the fuel elements can easily be detected when it is vaporized. Processes have therefore been proposed for detecting the rods of an assembly which show cracks, consisting in heating the sheaths of these rods close to a plug and detecting the vaporized or condensed water by an ultrasonic test by echoes. This process, which was the subject of French Pat. No. 2222732, has the disadvantage of necessitating the inspection of each of the rods in the assembly in isolation, after removal of one of the end pieces of the assembly.

Another process is described in French Pat. No. 2 341 182, where the fuel assembly is brought to a temperature above the boiling temperature of water so as to make possible the detection of acoustic signals which accompany the boiling of water in the defective rods.

Here again, the test must be made on each of the fuel rods individually.

Secondly, these methods necessitate raising the temperature of the fuel rods of the assembly sufficiently to cause boiling of the liquid, generally water, which it contains if it has cracks.

Another process is described in U.S. Pat. No. 4 039 376, in which the fuel assembly is placed inside an enclosure connected to a feed appliance which permits the feeding of water under pressure, and to an expansion valve which permits very rapid reduction of the water pressure in the enclosure.

When the assembly is plunged into the water under pressure, the gases contained in the cracked fuel elements, such as the gases resulting from the fission of certain materials contained in the fuel elements, are themselves under pressure to balance the pressure of the water surrounding the assembly.

If the pressure of the water surrounding the element is reduced very rapidly, the gas under pressure contained in the cracked fuel elements escapes through the cracks in the form of bubbles, and this emission of bubbles produces vibrations which can be recorded by a detector located inside the enclosure close to the assembly.

This process and the associated apparatus are however complicated in operation, and lack the sensitivity to permit detection of very small cracks.

The object of the present invention is therefore a process for detecting fuel assemblies of a nuclear reactor which have become defective in service in the reactor by the appearance of cracks in the sheath material enclosing the fissile material of the fuel elements constituting the assemblies. The process consists of testing separately each of the assemblies while it is entirely submerged in a liquid for protection against radiation, by causing an escape of gas resulting from the fission of certain material contained in the sheaths of the fuel elements through possible cracks in these sheaths, and in detecting this possible escape of gas by the recording of an acoustic and ultrasonic phenomenon connected with the escape of gas into the protecting medium, this process being easy to operate and of high sensitivity. The process comprises the following steps:

(1) The gas contained in the sheaths of the fuel elements of the assembly is caused to expand in order to cause the escape of gas bubbles into the protecting liquid if the assembly is defective.

the movement of (2) The gas bubbles in the protective liquid is stopped by means of a screen located above the assembly.

An acoustic phenomenon connected with the impact of these gas bubbles on the screen or with accumulation of gas below the surface of the screen is recorded, the appearance of this phenomenon permitting detection of the presence of a defective assembly.

In order that the invention may be more clearly understood, reference will now be made to the accompanying drawings, showing one embodiment of an apparatus which permits operation of the process of acoustic detection according to the invention, both where the expansion of the gas contained in the fuel elements is obtained by raising the temperature in a crack detection cell, and where this expansion is obtained by other means.

FIG. 1 shows the apparatus consisting of a mechanically fastened unit comprising a metal plate 1 shaped in the form of a part of a spherical surface, this metal plate serving at the same time as the screen stopping the progress of the gas bubbles upwards above the assembly, as acoustic resonator and as means of accumulating the gas escaping from the assembly.

Figure 1:
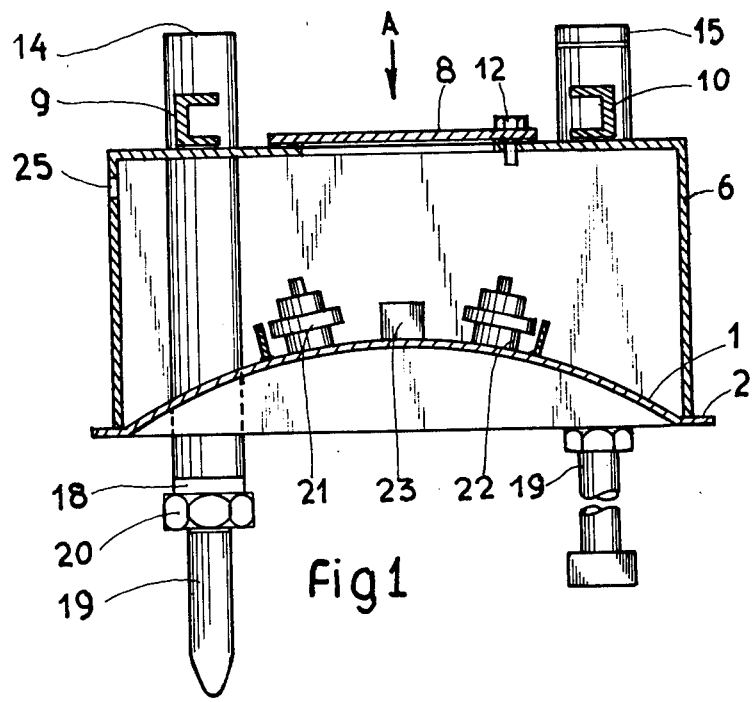
FIG. 1 shows a section through vertical the acoustic measuring instrument according to the invention.
Figure 2:
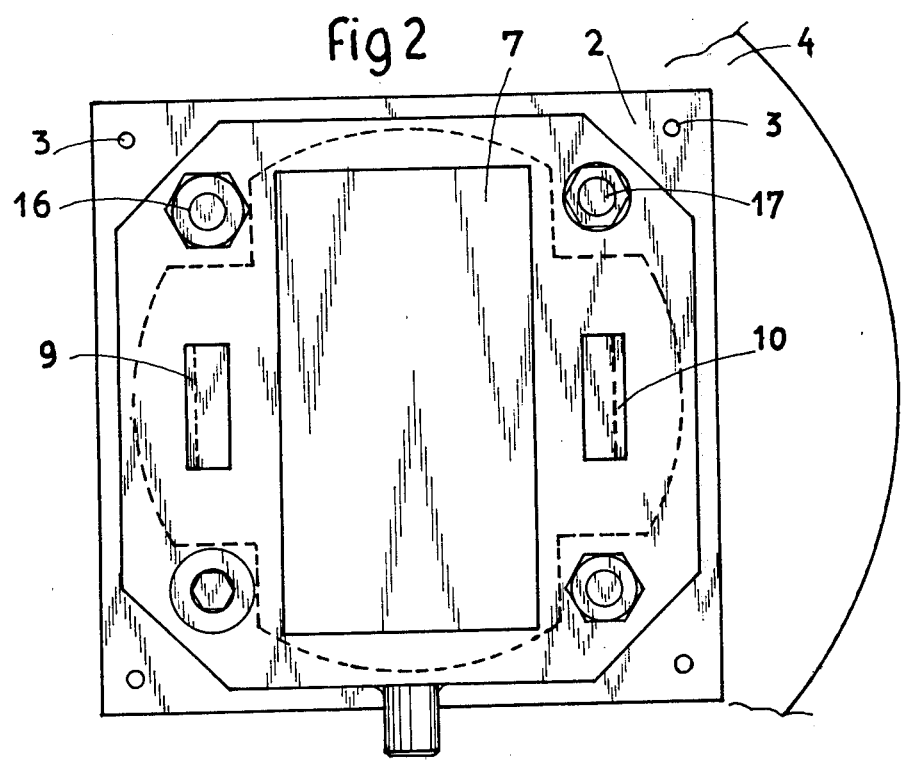
FIG. 2 shows a plan view from the direction indicated by arrow.

Plate 1 is itself fixed on a base plate 2. As can be seen in FIGS. 1 and 2, the base plate 2 has holes 3 at each of its corners for the fixing if required of the plate 2 onto a larger circular plate 4 which serves as support plate when the apparatus is placed on a crack detection cell enclosing the assembly.

On the base plate 2 is welded a chamber 6 completely enclosing the upper surface of the screen 1.

The chamber has on its upper face a hole 7 closed by an access trap 8 fixed to the chamber by the screws 12. Also fixed on the upper surface of the chamber 6 are two parts of the sections 9 and 10 which allow the apparatus to be gripped by the fuel handling equipment to move it with or without the fuel assembly.

Also fixed on this chamber are the tubes 14, 15, 16 and 17 at each corner of the chamber, each of these tubes being integral with a nut such as 18 into which can be fixed by screwing a threaded rod such as 19 which can be fixed in position by a locknut 20 tightened against the nut 18. Each of the rods 19 can locate in a hole provided in the upper plate of a fuel assembly, which permits centering of the measuring apparatus in relation to the fuel assembly and fasteners which permit the assembly to be secured to the measuring apparatus by means of the rods 19.

The upper surface of the screen plate 1 also carries high sensitivity acoustic emission detectors 21 and 22 and an ultrasound emitter-receiver 23.

The chamber 6 has openings such as 25 which allow it to fill with pool water when it is put into working position in the fuel pool, and which also serve as passage for measurement cables connected to the detectors 21 and 22 and the transducer 23.

A detection operation of detection carried out on a fuel assembly will now be described, firstly for the assembly brought from the reactor core by the station handling equipment and placed in a crack detection cell located in the fuel pool, and secondly for the assembly brought from the reactor core tested without the use of a crack detection cell.

In the first case, i.e., where the fuel assembly has been placed in a crack detection cell, the acoustic measuring apparatus is fitted with a support plate 4 of a shape and size corresponding to the shape and size of the cover of the crack detection cell.

A crack detection cell of the type described in French Pat. No. 2 389 202 comprises an enclosure of sufficient size to contain a fuel assembly of the reactor enclosing pool water and provided with means for thermally insulating it from the pool in which the crack detection cell is completely submerged. The cell is closed by a circular cover and provided with means of heating the assembly which allows the causing or augmentation of the escape of gaseous radioactive substance from the fuel elements of the assembly.

A circuit in which rare gas circulates connected to the crack detection cell allows entrainment of these radioactive gases and their analysis to determine whether the assembly has leaks.

To avoid the use of this circuit for analysis of radioactive gases, one can, when the assembly has been placed inside the crack detection cell, fit on this cell, instead of the cover plate the support plate, of the acoustic measurement apparatus according to the invention, this apparatus being transported and placed on the crack detection cell by means of the fuel handling boom.

To determine whether the fuel assembly has leaks, it is sufficient to raise the temperature after thermally insulating the inside of the cell from the pool, the raising of the temperature of the water in the cell causing expansion of the fission gases which form inside the fuel elements, and the escape of this gas into the crack detection cell if the assembly has leaks in the sheath material of the fuel.

If the assembly is defective, i.e., if such leaks exist, the fission gases pass out through the cracks and the bubbles escaping from the cracks rise to the upper part of the crack detection cell filled with pool water and impinge on the screen 1 and accumulate under the dome formed by this spherical screen.

The acoustic emissions which accompany any exit of fission gases from the fuel elements of the assembly which may occur are recorded by means of the detectors 21 and 22, and from the presence of such acoustic emissions the exit of gas under the effect of heat, and therefore the presence of cracks in the assembly, can be deduced.

Such emissions may be due to the noise emitted by the bubbles leaving through the cracks in the assembly as in the case of the process described in U.S. Pat. No. 4,039,376, but given the position of the acoustic detectors 21 and 22, this emission is mainly due to the impact of the gas bubbles on the screen 1, which is selected for perfect transmission of the vibrations to the detectors 21 and 22.

The detection of acoustic phenomena associated with the exit of bubbles is therefore much more certain than in the case of the prior art apparatus.

Secondly, when the gas accumulates at the top of the vault bounded by the screen 1, the echo of the ultrasonic signal (reflection echo from the upper part of the assembly, for example) emitted by the emitter-receiver 23 is modified, and by measuring the amplitude of the echo of this ultrasonic signal it is possible, after calibration, to deduce the volume of gas liberated into the crack detection cell, this volume being a linear function of the amplitude of the echo. This amplitude decreases as the volume of gas liberated to the top of the crack detection cell increases.

By measuring the amplitude of the echo after a known heating of the water in the crack detection cell and the assembly in it, the volume of gas liberated, i.e., the size of the cracks in the assembly, can be assessed.

This method of detection by recording the attenuation of the echo of an ultrasonic signal permits the detection of extremely small amounts of gas, of the order of 0.2 cm$^3$.

This method therefore has the advantage of being extremely sensitive and therefore usable for very small cracks, and of permitting quantitative measurement.

According to a second mode of operating the process according to the invention, the expansion of the fission gas contained in the fuel elements of the assembly can be produced by decreasing the external pressure to which the assembly is exposed.

When a crack exists in a fuel element of this assembly, the fission gas trapped in the fuel element is in equilibrium with the external pressure.

If the external pressure is reduced, the gas expands and escapes through the crack, which produces an effect equivalent to heating the assembly.

To reduce the external pressure of the medium in contact with the assembly, it has been found very advantageous to raise the assembly in the fuel pool (or in the reactor pool) by a certain height; the external pressure to which the assembly is subjected then diminishes with the value of the column of water having as its height the amplitude of the vertical displacement to which the assembly is subjected.

In order to use in this mode the apparatus according to the invention, it is sufficient to attach the apparatus to the top plate of the assembly and to raise the assembly under water either by means of the fuel handling equipment in the reactor pool or by means of one of the lowering appliances of the fuel pool.

It would equally be possible to use a lowering appliance in the reactor pool if such an appliance were provided in this pool.

For example, by means of a lifting appliance of the fuel pool, the assembly has been lifted by a height of 5 m in this pool.

This vertical displacement of the fuel assembly is sufficient to cause a liberation of fission gas easily detectable by acoustic emission and by attenuation of ultrasonic echo by means of the apparatus described above, used in the same way as before, even in the case of very small cracks.

Indeed, lifting the assembly by a height of 5.5 m, which is the height available in the fuel pools of nuclear reactors at present constructed, is equivalent from the point of view of expansion of the gas of cracked fuel elements to heating to a greater extent than can be obtained in crack detection cells under the conditions in which they are used at present.

In fact, the pressure at the bottom of the pool where the assembly is situated at the start of the upward movement, i.e., below 10 m of water, is equal to the atmospheric pressure to which is added the pressure of 10 m of water, say 2 bar.

With a rise of 5.50 m, the relative change of pressure, i.e., to a first approximation the relative change in volume of the gas, is equal to $(\Delta P/P)=(0.55/2)=27.5\%$.

To obtain the same change by heating in a crack detection cell would require: $(\Delta T/T)=(\Delta P/P)=(27.5/100)=(\Delta T/303)$ where $\Delta T=83.3°$ C., taking account of the temperature of the water in the pool.

A rise in temperature of the order of 83.3° C. cannot be obtained at present in crack detection cells either by rise in temperature of the element due to its own activity or by a more sudden temperature rise by means of electrical resistances.

Moreover, during depressurization of the assembly by lifting this assembly in the pool, the heat transfer sheath-fuel decreases, which results in a rise in temperature which also facilitates the expansion of the gases.

Since the depressurization is rapid there is no solubilisation of the gases in the water which surrounds the assembly, so that the bubbles are collected at the surface of the screen interposed in their passage.

If the method of depressurization of the assembly by raising it in the reactor pool is used instead of carrying out the raising of the assembly in the fuel pool, it is possible, given the construction of present reactor pools, to increase the lifting height by another meter, producing a greater expansion of gas.

In this case $(\Delta V/V)=(0.55+0.1)/(2+0.1)=31\%$

It may be pointed out that the method can be used effectively in the reactor pool since the test method used is independent of the activity of the water surrounding the assembly, because the method of measurement is entirely acoustic and does not involve any activity measurement.

It would therefore be advantageous to provide a lowering appliance in the reactor pool so as to be able to carry out the raising of the assembly under the same conditions as in the fuel pool.

It can be seen that the principal advantages of the process according to the invention and of the apparatus used in operating it consist in allowing detection of very high sensitivity, i.e., of assemblies with very small cracks, of being very easy to operate and of permitting the operation to be carried out in the reactor pool or in the fuel pool at will. With this process it can be determined very quickly whether or not a fuel assembly is defective.

The invention is not restricted to the embodiments described, but it includes various modifications.

Thus, for example, the process of expansion by heating or by depressurization which have been described are clearly not the only ones available.

It is also possible for the screen serving as barrier to the upward movement of the gas in the water surrounding the assembly to have an other than spherical shape, and it may be fixed to the assembly by any means whatever, as long as the screen is located above the assembly in the path of gas leakages from the fuel elements of the assembly.

Finally, the process and the apparatus according to the invention are not restricted to pressurised water nuclear reactors, but can be used for any other type of nuclear reactor using fuel elements comprising a fissile material enclosed in a sheath material which forms a gas-tight envelope and combines any number in the form of assemblies.

The spherical form of the screen permits sampling, if required, of the liberated gases by means of a mini-tube and a suitable receiver.

We claim:

1. Process for acoustic detection of fuel assemblies of a nuclear reactor which have become defective in service in the reactor, by the appearance of cracks in the material of the sheath enclosing the fissile material of the fuel elements constituting a said assembly, comprising the steps of testing separately each of said assemblies while the same is totally immersed in a liquid for protection against radiation, by causing the expansion and release of the gas contained in the sheaths of said fuel elements through any cracks in said sheaths, and detecting this possible release of gas by recording an acoustic phenomenon associated with said release of gas into the protective medium, wherein said progress of bubbles of said gas in the protective liquid is arrested by means of a screen (1) located above said assembly, and the acoustic emission due to the impact of said gas bubbles on said screen is recorded, the appearance of this acoustic emission permitting detection of defective assemblies.

2. Process of acoustic detection according to claim 1, wherein the expansion of said gas is caused by heating said assembly in a crack detection cell.

3. Process of acoustic detection according to claim 1, wherein the expansion of the gas is caused by depressurization of said fuel assembly produced by raising said assembly to a certain elevation in a pool filled with liquid for protection against radiation.

4. Process for acoustic detection according to any one of the claims 1 to 3, including the supplemental recordal of the attenuation of the echo of an ultrasonic signal emitted at the level of the surface of said screen, downwards, said attenuation in the case of a defective assembly being due to the presence of an accumulation of gas under the surface of said screen.

5. Apparatus for acoustic detection of fuel assemblies of a nuclear reactor which have become defective in service in the reactor, by the appearance of cracks in the material of the sheath enclosing the fissile material of the fuel elements constituting a said assembly, comprising a curved metal screen (1) the concavity of which is directed downwards, and on the upper convex surface of which is located at least one acoustic detector (21, 22), said screen being integral with a structure (2, 6) comprising means (19) for connecting said apparatus to an assembly and above said assembly, and gripping means (9, 10) for lifting said apparatus, connected or not, to a fuel assembly.

6. Apparatus according to claim 5, wherein said at least one acoustic detector (21, 22) located on said upper surface of said screen is a high sensitivity sonic detector.

7. Acoustic detection apparatus according to claim 5, comprising an ultrasonic emitter receiver located on said upper convex surface of said screen.

8. Acoustic detection apparatus according to claim 5, wherein said connecting means is a support plate (2, 4) corresponding in shape and size to the cover of a crack detection cell.

* * * * *